United States Patent [19]

Brumlik

[11] 3,991,534

[45] Nov. 16, 1976

[54] CLADDING ELEMENTS

[75] Inventor: George C. Brumlik, Montclair, N.J.

[73] Assignee: Ingrip Fasteners, Inc., New York, N.Y.

[22] Filed: Aug. 8, 1973

[21] Appl. No.: 386,679

Related U.S. Application Data

[63] Continuation of Ser. No. 126,707, March 22, 1971, abandoned.

[52] U.S. Cl. ........................ 52/483; 52/511; 24/204; 85/14
[51] Int. Cl.² .......................... E04B 5/52; A44G 17/00; A43B 23/20
[58] Field of Search ............... 24/204; 52/511, 715, 52/544, 483

[56] References Cited

UNITED STATES PATENTS

| 466,748 | 1/1892 | Allis | 256/8 |
|---|---|---|---|
| 578,447 | 3/1897 | Dent | 256/8 |
| 620,349 | 2/1899 | McDowell | 52/715 |
| 1,657,979 | 1/1928 | Thomas | 24/204 |
| 2,211,045 | 8/1940 | Balfe | 24/204 |
| 2,595,577 | 5/1952 | Harris | 24/204 |
| 3,071,827 | 1/1963 | Van Buren | 52/753 W |
| 3,391,434 | 7/1968 | Girard | 24/204 |
| 3,421,188 | 1/1969 | Rock | 24/204 |
| 3,455,539 | 7/1969 | Loofbourrow | 256/8 |
| 3,522,637 | 8/1970 | Brumlik | 24/204 |
| 3,703,739 | 11/1972 | Young | 24/204 |
| 3,748,701 | 7/1973 | De Mestral | 24/204 |

FOREIGN PATENTS OR APPLICATIONS

| 1,551,245 | 11/1968 | France | 24/204 |
|---|---|---|---|
| 1,912,744 | 10/1970 | Germany | 24/204 |
| 283,663 | 10/1952 | Switzerland | 52/753 W |

*Primary Examiner*—Bernard A. Gelak
*Attorney, Agent, or Firm*—Burgess, Dinklage & Sprung

[57] ABSTRACT

Cladding elements, such as tiles, plaques, wall panels, wall paper, vinyl covered cloth and the like are attached to or mounted on structural elements such as lath, sheet rock, and the like, by a method which includes providing cladding and structural elements with a receiving layer, positioning between the receiving layers a gripping member having a plurality of stiff gripping elements, the receiving layers being adapted to permit the gripping elements to penetrate and lodge therein, and pressing the elements together to cause the gripping elements to penetrate and become lodged in both receiving layers. Composite laminates formed by the method is also included.

1 Claim, 6 Drawing Figures

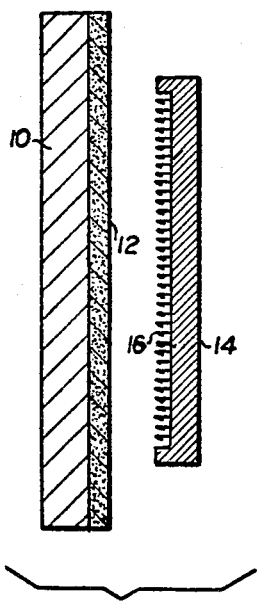
FIG. 2.
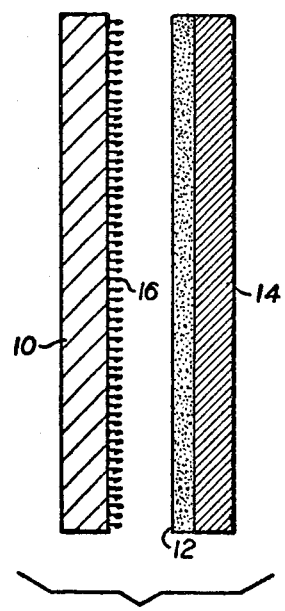
FIG. 3.
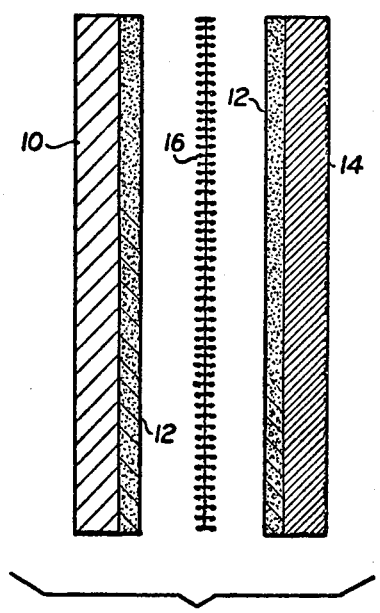
FIG. 1.
FIG. 4.
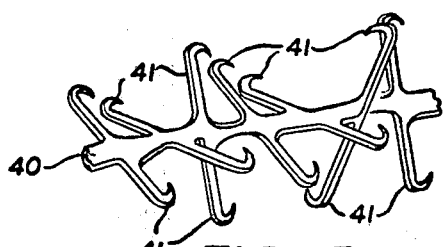
FIG. 6.
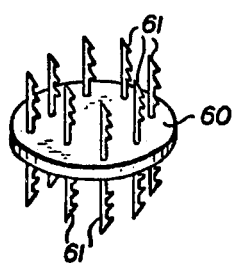
FIG. 5.
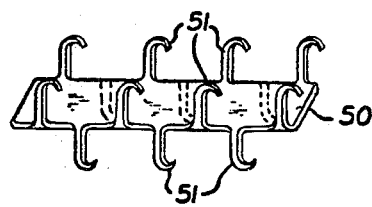

CLADDING ELEMENTS

This is a continuation of application Ser. No. 126,707, filed Mar. 22, 1971 now abandoned.

BACKGROUND

This invention relates to a method for mounting or attaching a cladding element such as a tile, plaque, or a wall panel to a structural element such as a wall, floor or ceiling.

In the past, cladding elements and wall coverings have been mounted using secondary attaching or fastening processes and devices such as adhesives, nails and the like. The present invention eliminates on the spot glueing or nailing processes and provides a strong self-gripping mechanism which is releasable, enabling the cladding element to be removed, replaced or repositioned. This mechanism provides for invisible attachment that is instant, clean and does not require special skills.

SUMMARY

The self-gripping method according to the present invention for attaching a cladding element to a structural element comprises:

1. providing a cladding element and structural element each with a receiving layer;
2. positioning between the receiving layers a gripping member having a plurality of stiff gripping elements extending towards both receiving layers, the receiving layers being adapted to permit the gripping elements to penetrate and lodge therein; and
3. pressing the elements together thereby causing a gripping element to penetrate and become lodged in both receiving layers.

In an alternate embodiment one of the receiving layers can be replaced by a plurality of firmly secured gripping elements. In this case, the need for a separate self-gripping member sandwiched between the wall-cladding material and the supporting structural element is obviated.

A composite laminate according to the present invention comprises a structural element and a cladding element each having a receiving layer which are fastened to each other by a gripping member having a plurality of gripping elements extending towards and lodged in both of said receiving layers.

DESCRIPTION OF THE DRAWINGS

FIG. 1 is an enlarged side elevational view showing a cladding element in position to be attached to a structural element.

FIGS. 2 and 3 are alternate embodiments of the preferred embodiment shown in FIG. 1.

FIGS. 4, 5 and 6 are enlarged perspective views showing suitable gripping members each having a plurality of gripping elements which are suitable for engaging two opposing surfaces at the same time for use in the present invention.

DESCRIPTION

Referring now to FIG. 1, illustrated are structural element 10 and cladding element 14 each having a receiving layer 12 thereon. Positioned between the receiving layers 12 is a preferred linear gripping member having a plurality of gripping elements 16 which extend towards both receiving layers 12.

FIG. 2 shows an alternate embodiment wherein the receiving layer on the cladding element 14 is replaced with a plurality of gripping elements 16 which extend towards the receiving layer 12 on structural element 10.

In FIG. 3 another alternate embodiment is illustrated which is opposite to that shown in FIG. 2, that is the gripping elements 16 are secured to structural element 10 and extend towards the receiving layer 12 on cladding element 14.

FIG. 4 illustrates a gripping member that can be used to advantage in the present invention. The gripping member is shown to include a linear member 40 from which radiate the gripping elements 41 which are shown having barbed hooks at the ends thereof. The gripping elements 41 can radiate from linear member 40 in a uniform or non-uniform pattern.

FIG. 5 illustrates a similar gripping member which includes a narrow strip 50 having gripping elements 51 positioned at the edge thereof and alternately extending up and down from both sides thereof. FIG. 6 shows yet another suitable gripping member which is in the form of a patch-like base 60 having a plurality of gripping elements 61 extending up and down from both sides thereof. Note also that the gripping elements 61 illustrate the use of a plurality of barbed hooks. The shape and type of the gripping elements may differ on opposite sides.

To carry out the method in the present invention referring to FIG. 1, the linear gripping member is positioned between receiving layers 12 which are simply pressed together thereby causing the gripping elements 16 to penetrate and become lodged in the receiving layers 12. It may be appreciated that the interior wall member such as sheet rock, lath, or a wooden structural member may be sufficiently frangible to receive and lodge self-gripping member and that a separate receiving layer may not be necessary. Any of the gripping members illustrated in FIGS. 4–6 may be employed in this manner to attach cladding element 14 to structural element 10. In the case of the gripping members shown in FIG. 6, it is preferred to use a plurality of these patch-like members to provide adequate support. For convenience, the gripping member is first attached to the receiving layer of the cladding element 14 if small, for example a tile, generally around the periphery thereof or if larger, for example a wall panel in any other pattern such as a web or the like which will provide adequate support. The cladding element 14 with the gripping member thereon is then simply pressed against structural element 10 causing the gripping elements 16 to become firmly embedded and lodged in both receiving layers 12.

In a similar manner in FIGS. 2 and 3, the elements 10 and 14 are simply pressed together causing the gripping element 16 to become embedded and lodged in the receiving layer 12.

The structural element 10 may be any structural member such as plaster ceilings and walls, sheet rock, wall board, panelling, plywood, wall studs, metal and wood lath, cement block, stone and the like.

The cladding element 14 may be any cladding element or member which is normally attached or mounted on a structural member and includes ceramic tiles, plaques, wood panelling, pictures, wall paper, and the like. The cladding element 14 may also be functional such as a light switch plate, a sign, and the like.

The receiving layers 12 used in the present invention can be made of any material which is sufficiently soft or porous to permit the gripping elements of the gripping member to penetrate and lodge therein. The thickness of the receiving layer depends on the nature and size of the gripping elements and generally falls within the range of 0.002 to 0.25 inches. Suitable receiving layers include woven, non-woven knitted fabrics and fibers, carpet-like materials, molded and foamed plastics, wood, metal and plastic mesh and expanded and perforated sheet materials such as those fabricated from metals and plastics.

The gripping elements used in the present invention are generally stiff members having barbs, hooks, truncated, cone-like bodies, serrated grooves and the like. The gripping elements can be made of metal wire, glass filaments or plastics such as polyacetals, nylons, polyesters, melamine and the like.

Suitable gripping members are shown in the drawing. Other suitable gripping members are described in my issued patents, U.S. Pat. Nos. 3,494,006 and 3,522,637 which are incorporated herein by reference. The gripping elements of the gripping member are generally sufficiently stiff such that they resist deflection which would otherwise prevent them from penetrating and becoming lodged in the receiving layers. The gripping connection between the gripping elements and the receiving layer can be permanent or releasable depending on the nature of the gripping element. For instance, a stiff but resilient gripping element can be removed by mechanical force. If desired, the gripping element can be provided with a cutting edge to facilitate insertion or removal.

The gripping elements generally have a diameter of from about 0.001 to about 0.05 inch and a length in the range of from about 0.05 to about 0.5. In FIGS. 2 and 3 they can conveniently be secured to the elements 10 or 14 by mechanical means or welding, gluing and like techniques. In FIGS. 4 and 5, the gripping members can be punched or cut from flat sheet metal, for instance, and then twisted or bent in the manner shown. In FIG. 6, the gripping elements 61 can be secured to the base 60 by inserting them from one side and positioning them using a suitable stop as shown in my patent, U.S. Pat. No. 3,494,006, mentioned previously.

The present invention has multiple uses. It may be used to mount or attach virtually any type of decorative elements which, as noted above, also extends to functional elements such as wall panelling and the like to any structural element such as sheet rock and the like. The present invention eliminates the use of secondary fastening processes and devices and provides a quick and efficient, one-step, self-gripping technique for permanently or temporarily attaching cladding elements to interior or exterior walls and the like.

What is claimed is:

1. Composite laminate comprising a structural element and a cladding element each having attached thereto a receiving layer adapted to permit gripping elements to penetrate and lodge therein, the receiving layers of said structural element and said cladding element being in face-to-face relationship, said cladding element being fastened to said structural element by a gripping connection formed between said respective facing receiving layers by a gripping member having a central linear strip member having a pair of substantially flat opposite faces generally paralled to each other, and a multiplicity of stiff gripping elements extending laterally from both opposite edges of said member, each said gripping element including a generally straight portion with a generally U-shaped portion at its end forming a hook, some of said straight portions extending out of the planes of said faces in a variety of directions and forming an irregular pattern, said gripping members extending towards the respective receiving layers of said structural and cladding elements, said gripping elements being firmly embedded and lodged in both the respective receiving layers of said structural element and said cladding element thereby forming said composite laminate with a multiplicity of gripping connections between the respective facing receiving layers of said structural element and said cladding element.

* * * * *